United States Patent [19]
Gore et al.

[11] 4,194,041
[45] Mar. 18, 1980

[54] WATERPROOF LAMINATE

[75] Inventors: Robert W. Gore, Hockessin; Samuel B. Allen, Jr., Newark, both of Del.

[73] Assignee: W. L. Gore & Associates, Inc., Newark, Del.

[21] Appl. No.: 920,275

[22] Filed: Jun. 29, 1978

[51] Int. Cl.² .................... A41B 17/00; A41D 3/04; B32B 27/40; B32B 27/28
[52] U.S. Cl. .......................................... 428/315; 2/82; 2/87; 2/135; 2/DIG. 1; 2/DIG. 5; 264/127; 428/321; 428/422; 428/513; 428/516; 428/523; 428/423.1
[58] Field of Search ............... 428/424, 425, 422, 310, 428/315, 321, 322, 421, 513, 516, 523; 2/DIG. 1, DIG. 5, 82, 87, 89, 135; 264/127

[56] References Cited

U.S. PATENT DOCUMENTS

| | | | |
|---|---|---|---|
| 2,631,290 | 3/1953 | Klepper | 2/87 |
| 3,005,728 | 10/1961 | Bridgeford | 428/424 |
| 3,228,821 | 1/1966 | Trope | 2/87 X |
| 3,391,049 | 7/1968 | Manwaring | 428/424 X |
| 3,558,417 | 1/1971 | Salyer et al. | 428/425 X |
| 3,595,732 | 7/1971 | Tingerthal | 428/425 X |
| 3,663,266 | 5/1972 | Dye | 428/227 |
| 3,694,301 | 9/1972 | Gruenewald et al. | 428/292 |
| 3,779,855 | 12/1973 | Fonzi et al. | 428/315 X |
| 3,953,566 | 4/1976 | Gore | 264/127 X |
| 4,133,927 | 1/1979 | Tomoda et al. | 428/421 X |
| 4,154,876 | 5/1979 | Segawa et al. | 428/421 X |

FOREIGN PATENT DOCUMENTS 626803  1/1963  Belgium.

OTHER PUBLICATIONS

Business Week, "The Fabric that Revolutionized the Amer. Coach-Naughahyde," May 28, 1978.
"Polyurethane Coatings," published by Nayes Data Corp., copyright 1972, Chapter 2, pp. 138-232.

Primary Examiner—Harold Ansher
Attorney, Agent, or Firm—John S. Campbell

[57] ABSTRACT

A waterproof article for use in, for example, protective clothing. The article prevents liquid water from penetrating through to undergarments while at the same time permitting moisture vapor such as perspiration to pass out through the article. The article is thus both breathable and waterproof. The article is layered: a microporous hydrophobic outer layer which permits the passage of moisture vapor but resists penetration by liquid water at pressures up to about 345 Kn/m²; a hyrophilic inner layer permitting the transfer of moisture vapor but preventing surface tension lowering agents such as those contained in perspiration and/or body oils from reaching the hydrophobic layer.

28 Claims, 4 Drawing Figures

WATERPROOF LAMINATE

FIELD OF THE INVENTION

This invention relates to a waterproof layered article in sheet form that possesses a high moisture vapor transmission rate even under adverse climatic conditions. The article is suitable for use in rainwear garments and tents.

BACKGROUND OF THE INVENTION

Protective garments for wear in rain and other wet conditions should keep the wearer dry by preventing the leakage of water into the garment and by allowing perspiration to evaporate from the wearer to the atmosphere. In the past, and through a long history of rainwear development, truly waterproof materials have not allowed the evaporation of perspiration, so that a wearer who is physicaly active, becomes sweat soaked. "Breathable" materials that do permit evaporation of perspiration, have tended to wet through from the rain, and they are not truly waterproof. Oilskins, polyurethane coated fabrics, polyvinyl chloride films and other materials are waterproof but do not allow satisfactory evaporation of perspiration.

Fabrics treated with silicone, fluorocarbon, and other water repellants usually allow evaporation of perspiration but are only marginally waterproof; they allow water to leak through them under very low pressures, and usually leak spontaneously when rubbed or mechanically flexed. Rain garments must withstand the impingement pressure of falling and wind blown rain and the pressures that are generated in folds and creases in the garment.

It is widely recognized that garments must be "breathable" to be comfortable. However, it is not necessary that air pass through the garment for it to be comfortable, only that water vapor from perspiration be transmitted from inside to outside so that undergarments do not become wet and so that the natural evaporative cooling effect can be achieved. Breathability and ability to transport interior moisture vapor to the external environment are used interchangeably in this discussion.

The transport of water through a layer can be achieved in a number of ways. Wicking is the most common when large quantities of moisture are to be transferred. Wicking materials are hydrophilic in that a drop of water placed on the surface of these materials forms an advancing water contact angle of less than 90 degrees so that they wet spontaneously. They are also porous with pores that interconnect to make complete pathways through the wicking material. Liquid water moves by capillary action from interior surface to exterior surface where it evaporates. Although some wicking materials may resist pressure induced flow of liquid water through them due to the tortuousity and length of flow path, they readily transport water by capillary action from the exterior surface to the interior surface and so are unsuitable for rain material. The comfort attributed to cotton garments in warm climates results from its ability to transport water to the exterior surface where it can readily evaporate and provide cooling. Another natural wicking material is leather which owes its great comfort to breathability via wicking.

A recent invention (U.S. Pat. No. 3,953,566) has provided porous membranes that satisfy the two comfort requirements of being waterproof while also being permeable to the flow of water vapor. For rainwear, these membranes are usually laminated to fabrics for mechanical protection and style. The membranes are inherently hydrophobic and contain very small pores that resist the entry of liquid water even at substantial pressures or when rubbed or flexed, but readily allow the flow of gases, including water vapor. Unlike wicking materials, breathability is achieved by evaporation of liquid water inside the garment or on the inner surface of the membrane followed by gaseous flow or diffusion of water vapor through the membrane to the outside.

However, when these new garments are worn for strenuous activities causing the wearer to perspire copiously, surface active agents in the perspiration gradually penetrate the hydrophobic membrane, coat its interior surfaces and cause it to lose its waterproof characteristics and become a wicking material. In order to restore waterproofness, the garment must be cleaned to remove the surface active contaminates. In practice this is a drawback to widespread commercial acceptance of such garments.

BRIEF DESCRIPTION OF THE INVENTION

This invention provides a layered article, for use in waterproof garments or tents, that is waterproof, resistant to surface active agents in perspiration, but still permits the evaporation of the perspiration and the transfer of moisture vapor through the layered article.

The invention comprises a combination of at least two layers: (1) an interior, continuous hydrophilic layer that readily allows water to diffuse through, prevents the transport of surface active agents and contaminating substances such as those found in perspiration, and is substantially resistant to pressure induced flow of liquid water; and (2) a hydrophobic layer that permits the transmission of water vapor and provides thermal insulating properties even when exposed to rain.

Garments made of these materials are permanently waterproof from exterior water sources yet allow the evaporation of perspiration whenever the partial pressure of water vapor inside the garment exceeds that outside. In practice this encompasses nearly all climatic conditions.

The hydrophilic film has a moisture vapor transmission rate exceeding 1000 gms./m$^2$. day, and preferably above about 2000 gms./m$^2$. day, permits no detectable transmission of surface active agents and preferably permits no detectable flow of liquid water at hydrostatic pressures up to 172 kN/M$^2$.

The hydrophobic layer has a moisture vapor transmission rate exceeding 1000 gms./m$^2$. day and preferably exceeding 2000 gms./m$^2$. day, and an advancing water contact angle exceeding 90 degrees, and is preferably formed of a porous hydrophobic polymer.

DETAILED DESCRIPTION OF PREFERRED EMBODIMENTS OF THE INVENTION

Figure 1:
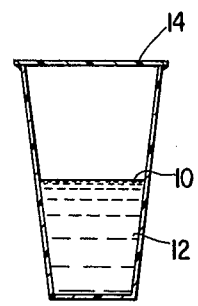
FIG. 1 shows the apparatus for determining Moisture Vapor Transmission Rate (MVTR) as described in ASTM-E96-66B.

Breathability is achieved in this invention by transport of water by diffusion. The driving force for this mechanism of transfer is the water vapor partial pressure difference across the layered article.

An interior layer of the layered article of this invention is a continuous hydrophilic layer. The term "hydrophilic" has been used by others in reference to several different characteristics of materials, which include the following:

(1) Materials that absorb substantial amounts of water when immersed in it.

(2) Materials that absorb moisture from the atmosphere.

(3) Porous materials that wet through easily when brought in contact with water.

(4) Porous materials that absorb water into their structure when brought in contact with it.

(5) Materials that have surfaces easily wet with water.

(6) Materials that are permeable to water vapor.

The term "Hydrophilic film" used in this invention is restricted to continuous films, including closed cell, foamed film. These films do not allow the flow of gases or liquids through open pore channels in the materials but do transfer substantial amounts of water through the film by absorbing water on one side of the film where the water vapor concentration is high, and desobring or evaporating it on the opposite side of the film where the water vapor concentration is low.

If a continuous film of hydrophilic material is exposed to air containing substantial water vapor on one side of the film, and to air containing less water vapor on the other side, the side of the film exposed to the higher water vapor concentration will absorb water molecules which diffuse through the film and are desorbed or evaporated on the side exposed to the lower water vapor concentration. Thus, water vapor is effectively transported through the film on a molecule by molecule basis. The hydrophilic materials of this invention do not necessarily have hydrophilic surface characteristics as indicated by advancing water contact angle. In fact, the two specific examples cited here as suitable hydrophilic materials have advancing water contact angles exceeding 90 degrees and may be considered hydrophobic from that point of view.

The hydrophilic materials of this invention are selective in absorbing and transporting water and not surface active agents and organic materials generally, nor do they allow gases such as oxygen and nitrogen to flow through them readily under hydrostatic pressure. They are also resistant to hydraulic flow of liquids, including water. These continuous, hydrophilic films are unique in transporting water solely by the absorption evaporation mechanism. They do not transfer water by capillary action or by wicking. Water molecules are not believed to be transferred in association with other water molecules as with normal hydraulic and capillary flows. Indeed, the hydrophilic films in combination with any fabric used as a support, form a usefully waterproof sheet that possesses a moisture vapor transmission rate that is generally not greatly lower than the moisture vapor transmission rate of the fabric used as a support. Hydrophilic films tend to be weak and easily torn, especially when swollen with water. Therefore, they need to be supported and protected by physically strong, flexible, abrasion resistant coverings that are premeable to the passage of water vapor. If the outer covering of a garment is not hydrophobic, it will become wet through by rain, and thus allow the hydrophilic film to chill.

The hydrophilic layer cannot be porous in the sense that there are passageways larger than molecular size. Still it can be a foam so long as the foam is not open celled. Somewhere there must be a continuous barrier layer to the passage of surface active molecules. One of the preferred hydrophilic materials is a foam.

Two commercially available hydrophilic materials have been found that embody the requisite properties of this invention. One is an organic polymer with a hydrophilic backbone sold under the trademark Hypol ® by W. R. Grace & Co. Hypol ® is a reactive prepolymer that can be crosslinked by water and/or multifunctional amines, including blocked carbamate amines. Hypol has a backbone of polyoxyethylene units which end with touene diisocyanate groups. The structure is essentially a branched polyether with a maximum of three reactive isocyanate (NCO) groups per molecule. The second hydrophilic material is a fluorocarbon with hydrophilic side groups sold under the trademark Nafion ® by E. I. duPont de Nemours & Co. Nafion ® is a perfluorosulfonic acid product. It is described as a copolymer of tetrafluoroethylene and a monomer such as perfluoro-3, 6-dioxa-4methyl-7-octensulfonic acid.

Because of the great chemical difference of these hydrophilic polymers, it is believed there are additional suitable hydrophilic materials that could be useful.

The exterior layer of the two layered embodiment of this invention is hydrophobic, porous, and permeable to gases. Hydrophobic, as used here, means that water will not spread on the material and wick into its porous structure. A drop of water placed on the surface of a highly hydrophobic layer will remain in the form of a nearly spherical bead with an advancing water contact angle greater than 90 degrees. Water vapor which evaporates or desorbs from the inner hydrophilic layer is free to flow or diffuse as a gas through the pores of the hydrophobic layer to the exterior environment.

Where the external relative humidity is 100% as it may be in raining conditions, a favorable vapor pressure differential can only be achieved when the inside temperature is higher than outside. For this reason, it is desirable to have an insulating layer outside the hydrophilic layer. This steepens the thermal gradient produced by body heat, increases the vapor pressure difference (presuming 100% relative humidity inside), and thus increases the moisture vapor transmission rate. If the inside surface of the garment is too cool, perspiration vapor will condense on the cool surface and wet the clothing and person within.

It is undesirable for the outer layer to lose most of its thermal insulating properties when it becomes wet with rain. Therefore, the outer layer is preferred to be hydrophobic and waterproof. It is preferred that this layer be waterproof at water pressures exceeding 172kN/M$^2$ so as to retain its thermal insulating properties and not become wet even when it is subjected to high velocity wind blown rain, and/or mechanical flexing and rubbing. A film of porous, expanded polytetrafluoroethylene, which has been heated above its crystalline melt point after expansion, has been found to be an ideal hyrophobic layer for rainwear applications. These films are highly porous, a property which gives them good thermal insulating qualities, yet the pores are very small in size which leads to high water entry pressures. This porous material allows water vapor to diffuse from a zone of relatively high water vapor pressure inside a warm rainwear garment to a zone of lower water vapor pressure at the colder outside. U.S. Pat. No. 3,953,566 describes the preparation of the desirable microporous, expanded, polytetrafluoroethylene hydrophobic films.

Other hydrophobic materials for use in the outer layer include highly crystalline films of expanded PTFE, which have not been heated above their crystalline melt point, and films of other microporous hydrophobic polymers such as polypropylene, which possess the necessary moisture vapor transmission and waterproofness characteristics. Celanese Plastics Co. sells such a microporous polypropylene film under the trademark Celgard ®. Other hydrophobic layers, which are less useful for their insulating properties because water wets through them at lower pressures, are still useful. These include tightly woven fabrics of fine hydrophobic fibers including polyolefin fibers such as polyethylene and polypropylene, polytetrafluoroethylene fibers, and other fibers treated with hydrophobic agents. Also, tightly spaced nonwoven webs of the above described fibers may be useful.

Hydrophilic and hydrophobic layers can be attached using a variety of procedures. Edges of the layers can be attached, for example, by sewing or by an adhesive. Alternately, an adhesive can be applied to join other portions of the surface area of the two layers. This technique may reduce somewhat the area available for transmission of water vapor, but most of the area remains.

Another technique which can be used is to cast a hydrophilic layer directly on a microporous hydrophobic layer with the application of sufficient hydraulic pressure to force the hydrophilic polymer to penetrate into the surface void spaces of the hydrophobic layer and thereby bond the hydrophilic layer to the hydrophobic layer.

The novel layered article of this invention can be usefully incorporated into a variety of laminar combinations. Textile layers can be added for strength and aesthetic characteristics to both the hydrophilic layer and the hydrophobic layer, so that these two necessary layers are sandwiched in the middle and there is a total of four layers. For example, in applications such as rainwear and mountaineering equipment, it is desirable to provide an outer layer of a textile fabric, such as nylon or polyester, adjacent to the hydrophobic layer, and an inner layer of another textile fabric, such as a nylon tricot knit, adjacent to the hydrophilic layer for wear resistance and to provide the composite with a typical textile feel and hand. For down jackets and sleeping bag shells, a textile layer positioned adjacent the interior of the hydrophilic layer is not needed.

The moisture vapor transmission rate through the layered article of the invention should be above 1000 and is preferably above 2000 gms./m$^2$. day to provide for escape of moisture from the interior of an enclosure formed by the article. These extremely high levels of moisture vapor transmission can be achieved, even when the hydrophobic layer and hydrophilic layer are adhesively bonded together over dotted portions of the area of the sheets.

The individual layers and the assembled layered article should be flexible, and preferably soft and pliable, if the article is to be used in garments such as rain suits, or in tents, sleeping bag covers and the like. One significant advantage of the present invention is that waterproofness and moisture vapor transmission can be achieved with a lightweight construction, and thus the sheet material is desirable for use in outer garments, tents and other uses by backpackers, mountain climbers and others who desire lightweight equipment.

Finally, this invention provides material suitable for truly all-weather garments, not just rain garments. Because these layered articles are impermeable to air, they make excellent windbreakers. They also provide sufficiently high moisture vapor transmission rates to allow men to survive desert conditions whereas garments which are impervious to moisture vapor transport allow no cooling effect and quickly lead to heat exhaustion by the wearer.

The following examples illustrate embodiments of the invention. All parts and percentages are by weight, unless otherwse noted.

A. The tests used in the examples are:

1. Tests For Waterproofness

Figure 3:
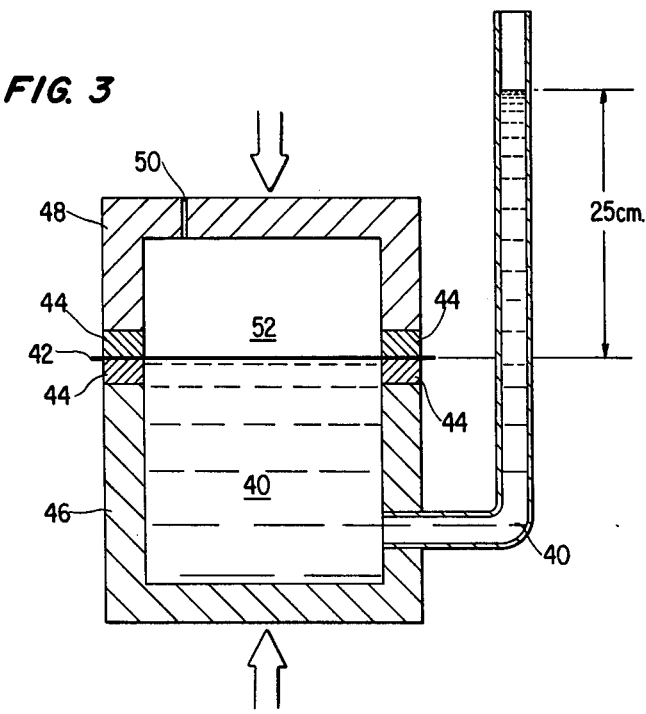
FIG. 3 shows the test apparatus for the 25 cm water head waterproofness test.

The only true test for waterproofness is actual use where there is mechanical stress, flexing, rubbing, temperature cycling and the possibility of contamination by a myriad of substances. In order to provide a means of comparison in the laboratory, the following two tests were used. The first uses a modified Sutter's test apparatus. FIG. 3 is a schematic diagram of this apparatus. Water 40, under a hydrostatic head of 25 cm water is forced against a sample 42 sealed by two silicone rubber gaskets 44 between a container 46 with a clear plexiglass top 48. The top 48 and container 46 being forced together by clamps. The top 48 has a 1/32" air vent 50. The 25 cm water head corresponds to a test pressure on the sample of about 2 KN/M$^2$. The upper surface 52 of the sample 42 is visually observed for the appearance of any water which may be forced through the sample. It should be noted that a reasonably long time period is required at the test for leakage to be detected, especially for microporous materials where the water flow is slowed by the small, often tortuous flow channels. If no water is detected after 20 minutes, the material has passed this test for waterproofness. Passing this test is considered to be a very minimum criteria for a material to be considered waterproof.

Figure 4:
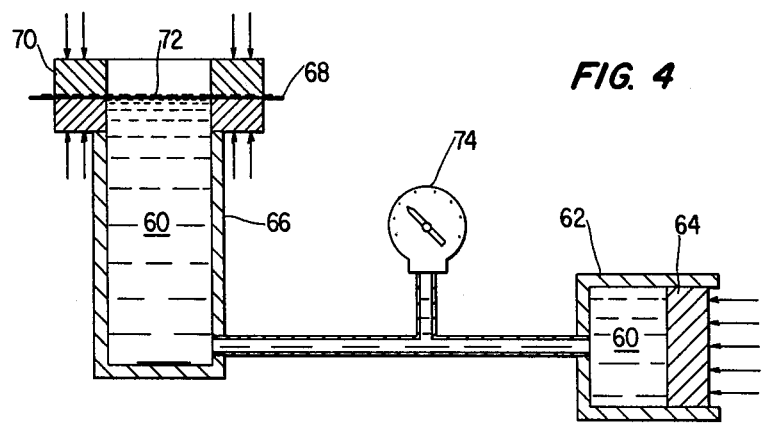
FIG. 4 shows the Mullin's Burst Test apparatus used in the 172 kN/M$^2$ and 345 kN/M$^2$ waterproofness tests.

The second laboratory test method utilizes apparatus employed in the Mullin's Burst Test (Fed. Std. 191, Method 5512) and is shown schematically in FIG. 4. The test procedure consists of raising the pressure of water 60 to the test level over a period of approximately 10 seconds, holding the pressure at that level for 30 seconds, and visually determining leakage as in the previous test. The water pressure is raised by forcing water 60 from a cylinder 62 by means of a piston 64 into a cylindrical container 66. The sample 68 is held above container 66 by clamping on a top of annular ring 70. The pressure is shown on gauge 74.

A metal screen 72 is placed on top of the test sample to prevent it from bursting at elevated test pressures. A test pressure level of 172 kN/M$^2$ level has been used by the U.S. Army as an acceptance level of waterproofness for their waterproof garments. Their test method, however, differs in that the pressure is continually increased until leakage is observed. This procedure can yield misleading and overly favorable results when used on microporous materials. The better procedure of maintaining the pressure at a pre-determined level for a fixed time is used to obtain the values reported herein.

2. Test For Air Permeability

The permeability to air of the samples was measured by a Gurley densometer (ASTM D72658) manufactured by W. & L. E. Gurley & Sons. Results are reported in terms of Gurley number which is the time in seconds for 100 cm of air to pass through one square inch of the sample under a pressure of 4.88" of water head pressure. This measurement can be converted into metric permeability units ($cm^3 cm/sec. cm^2 cm.Hg$) by the following formula: thickness of sample×0.0432/Gurley number.

3. Test Method For MVTR

The test apparatus for determining moisture vapor transmission rates (MVTR), as described in ASTM-E96-B 66B, is shown in FIG. 1. This method is not suitable for determining the very high MVTR of materials described in this invention because the air gap between the surface 10 of the water 12 and the material 14 to be tested is itself a significant resistance to the passage of water vapor. This stagnant air gap has an estimated MVTR of about 900 gms./$m^2$. day which establishes the upper limit of MVTR that can be detected with this test configuration.

Figure 2:
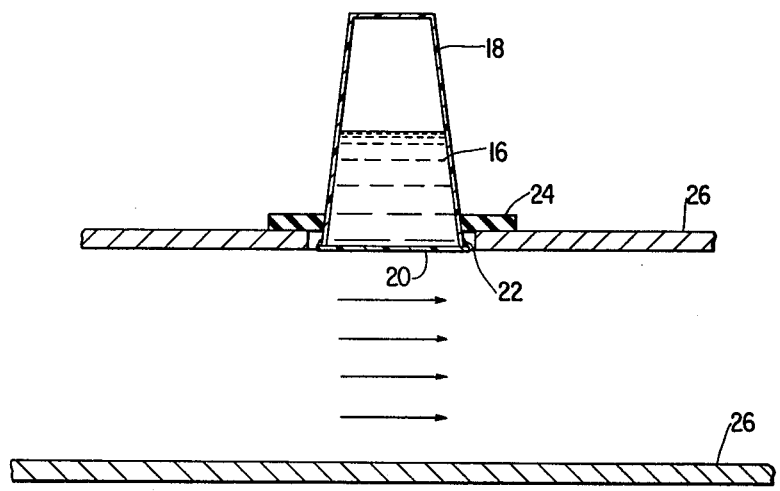
FIG. 2 shows the modified test configuration used to bring water 16 directly in contact with the surface of the test material 20.

For the high MVTR materials of this invention which are also waterproof, a modified test configuration has been used in which the air gap is eliminated by inverting the cup to bring the water directly in contact with the surface of the test material (FIG. 2).

The procedure is as follows. Approximately 80 cc of water 16 is placed in a tapered polypropylene cup 18 which is 4.5 inches high with a 2.5" diameter mouth. The material 20 to be tested is sealed to the lip of the cup with a silicone adhesive 22. The cup assembly is weighed to the nearest 1/100 gram and an elastic rubber collar 24 is placed on the cup under tension. In an environmental chamber 26, the assembly is suspended upside down through a circular opening in a support plate, its position being adjusted by means of the rubber collar so that the mouth of the cup is aligned with the lower surface of the plate. Between this surface and the bottom of the chamber there is an approximately 4" air space across which air is caused to flow at about 650 ft./min. The chamber is held at a temperature of 73 degrees F.±2 degrees F. and a relative humidity of 50%±2%. The sample remains in the chamber for three hours and is then removed and weighed again to within 1/100 of a gram. The moisture vapor rate is then expressed in grams of water lost per square meter of sample surface area per 24 hours.

EXAMPLE I

Human perspiration was collected by wringing a sweat soaked garment. 25 ml was placed in a cup for the moisture vapor transmission rate test. A GORE-TEX® microporous PTFE membrane, which had been tested to determine that it was waterproof when subjected to tests at 25 cm water head, and at 172 kN/$M^2$ and 345 kN/$M^2$ water pressure, was sealed onto the lip of the test cup.

The cup was inverted and left inverted under ambient conditions until all the perspiration had evaporated through the Gore-tex® membrane, a period of about two days.

The naturally white membrane now appeared brown and visibly contaminated on both sides. The dry, contaminated membrane showed a weight gain of 0.265 gms. due to residual contamination in and on it.

The contaminated membrane was pressure tested at a 25 cm head of water and found to leak almost immediately in one spot and was visibly leaking over its entire surface in three to four minutes.

When the membrane was subjected to the 172 kN/$M^2$ test, water flowed through it profusely.

EXAMPLE II

Hypol FHP3000® foamable hydrophilic polyurethane polymer was cast about 0.0025 inch thick onto a Gore-tex® PTFE membrane, which was used in this case only as a release sheet. The sample was also covered with a Gore-tex® membrane release sheet. Care was taken not to rub the Hypol polymer such that adhesion occurred. The Hypol® polymer and release sheets were placed in a humidity chamber at 96% relative humidity and cured for one hour. After curing a Hypol® film was removed from the release sheet.

Water reacts to crosslink the Hypol® polymer. If water is introduced quickly or at an elevated temperature, foaming occurs. In a high humidity chamber at ambient temperature, water is introduced slowly enough that a nonporous cured film is obtained.

A sample of Hypol® film prepared above was tested for moisture transmission rate in the inverted cup test and found to have a value of 11,575 gms./$m^2$. day. Another sample of film was tested for air permeability in a Gurleyometer and found to have no permeability within the testing capability. A further sample of the film was tested for waterproofness at 25 cm head water pressure for 20 minutes and at 172 kN/$M^2$ for 30 seconds and no leaks were detected.

25 ml of human perspiration from the same source as was used in Example I was placed in a moisture vapor test cup and covered first with the Hypol® membrane and then with the Gore-tex® membrane similar to that used in Example I. The edges were sealed and the cup was inverted. The perspiration was allowed to evaporate as in Example I. After the perspiration had evaporated, the Gore-tex® membrane did not appear to be contaminated, and it did not have a measurable weight increase. However, the Hypol® membrane was stained and covered with residue from the perspiration on the side that had been in contact with perspiration.

When the Gore-tex® membrane was tested for waterproofness in the standard ways at 25 cm head of water and at 172 kN/$M^2$ for 30 seconds, it did not leak, indicating that it had not been contaminated. When the Hypol® film was tested for waterproofness, it also did not leak at either test condition. The Gore-tex® membrane was then tested at 172 kN/$M^2$ for 20 minutes and did not leak. When the Hypol® membrane was tested at this condition, there was no gross leakage, but there was detectable moisture having penetrated through the membrane.

EXAMPLE III

A 0.0025" film of Hypol FHP3000® prepolymer was cast on a Gore-tex® microporous PTFE sheet similar to that used in Example I. The Hypol® prepolymer was then uniformly sprayed with water. The reacting liquid was massaged by hand over the surface of the Gore-tex® sheet until the curing reaction had proceeded far enough for the Hypol polymer to be viscous and tacky. The sample was placed in a humidity chamber at 96% relative humidity for 30 minutes to effect a complete cure. The composite sheet had a thickness of 0.008" and an MVTR of 7,300 gms./$m^2$. day. The sample was waterproof under both standard tests, before and after 25 ml of perspiration had been evaporated through the sample.

EXAMPLE IV

Celgard ® microporous polypropylene is a product of Celanese Plastics Co. A sheet of Celgard 2500 ® was tested and found to have a thickness of 0.001 inch, an air permeability of zero on the Gurley densometer. It was tested for waterproofness and found to be waterproof by the standard tests at 25 cm water head and at 172 kN/M$^2$ water pressure. When 25 ml of perspiration were evaporated through this film as in Example I, it subsequently failed the waterproofness test at 25 cm water head and therefore, was not tested at 172 kN/M$^2$.

By a procedure similar to Example III, a layer of Hypol ® 3000 polymer was cast onto one side of an uncontaminated Celgard ® sheet to form a firmly adhered composite sheet. The composite sheet was tested for MVTR and found to have a value of 7,700 gms./m$^2$. day. The thickness of the composite sheet was 0.005 inch. No permeability to air was detected on the Gurleyometer.

In a procedure similar to Example I, 25 ml of perspiration was evaporated through the sample. The sample was then tested for waterproofness and found to be waterproof at both standard test conditions of 25 cm water head and 172 kN/M$^2$ water pressure.

EXAMPLE V

A sheet of Nafion 120 ® perfluorosulphonic ion exchange membrane was measured to have an MVTR of 12,000 gms./m$^2$. day, no measurable air permeability, and a thickness of 0.005 inch. When combined with a PTFE sheet, similar to that used in Example I, by adhering them together with dots of silicone adhesive, the composite two layered sample had a MVTR of 4,900 gms./m$^2$. day. In a procedure similar to that of Example I, 25 ml of perspiration was evaporated through the sample, the Nafion 120 ® membrane being in contact with the perspiration. After the perspiration had been evaporated, the Gore-tex ® PTFE sheet did not appear to be contaminated. The Gore-tex ® sheet was then delaminated from the Nafion sheet and tested for waterproofness. It was found to be waterproof at both 25 cm water head and a 172 kN/M$^2$ water pressure.

EXAMPLE VI

A laminate was made consisting of the following four layers:

| Layer | Material | Wgt (Oz/Yd) |
|---|---|---|
| 1 | Water repellent nylon taffeta | 1.9 |
| 2 | Gore-tex ® microporous PTFE membrane | 0.44 |
| 3 | Hypol 2000 ® hydrophilic polyurethane | 0.3 |
| 4 | Nylon tricot knit | 1.5 |

The laminate was made in two steps.

First the nylon taffeta was affixed to the Gore-tex ® membrane by gravure printing a dot pattern of adhesive onto the Gore-tex ® PTFE membrane and pressing the nylon taffeta to it through a nip roll and then over a heated roll to further melt and bond the adhesive. This resulted in a well bonded laminate of the first two layers. The Gore-tex ® membrane of this laminate was then gravure printed with Hypol 2000 ® prepolymer and passed through a nip roll to smear the Hypol 2000 ® prepolymer and press it into the Gore-tex ® membrane. Nylon tricot knit was run through a water dip and then brought into contact with the layer of Hypol 2000 ® prepolymer. The purpose of the water contained in the tricot knit was to initiate curing of the Hypol 2000 ® prepolymer. The entire four-layer laminate was fed onto a tenter frame and through an oven at 170 degrees C. to accelerate the cure. The resulting laminate was well adhered with the Hypol 2000 ® layer acting as an adhesive to bond the knit to the Gore-tex ® membrane.

Microscopic examination of the Hypol ® layer revealed that considerable foaming had occurred. However, the properties of the laminate proved that there was a continuous layer of Hypol ® hydrophilic polymer present.

The properties of the laminate were as follows:

| | |
|---|---|
| MVTR | 2500 |
| Air permeability+ | 0 |
| Waterproofness: | |
| 25 cm water pressure - passed - no leak after 20 mins. | |
| 25 psig water pressure - passed - no leak after 30 sec. | |
| 345 KN/m$^2$ psig water pressure - passed - no leak after 30 sec. | |

+ Air permeability was measured on a Gurleyometer.

A jacket was then made up from the laminate and given to a person who had participated in field testing outdoor garments, and who had previously experienced loss of waterproofness due to contamination by perspiration of a garment containing a layer of microporous polytetrafluoroethylene.

After wearing the jacket under conditions that he would have expected to contaminate it—camping, skiing, and mountain climbing—he reported that the garment remained waterproof. Further he found the garment continued to be breathable and served as an excellent windbreaker.

What is claimed is:

1. A flexible layered article suitable for use in waterproof garments, or tents, which permits transfer of water vapor to prevent the build-up of moisture, the layered article retaining its resistance to transmission of liquid water even when the interior face of the article is exposed to a surface tension lowering agent, such as perspiration and body oils, comprising:

(a) a flexible, first layer of hydrophobic material having a moisture vapor transmission rate exceeding 1000 gms./m$^2$. day and an advancing water contact angle exceeding 90 degrees; and (b) a continuous hydrophilic layer attached to the inner face of said first layer, said hydrophilic layer having a moisture vapor transmission rate exceeding 1000 gms./m$^2$. day and forming a barrier to passage of a surface tension lowering agent that would if present in said first layer tend to reduce the waterproofness of said first layer.

2. The layered article of claim 1 in which said hydrophilic layer does not permit detectable passage of liquid water therethrough at a pressure of at least about 25 cm water head for 20 minutes.

3. The layered article of claim 1 in which said hydrophilic layer does not permit detectable passage of liquid water therethrough at pressures of between about 25 cm water head and about 172 kN/M$^2$ for 30 seconds.

4. The layered article of claim 1 in which said hydrophilic layer does not permit detectable passage of liquid water therethrough at a pressure of about 172 kN/M$^2$ for 30 seconds.

5. The layered article of claim 1 in which said hydrophobic layer is in laminar contact with said hydrophilic layer.

6. The layered article of claim 1 in which said hydrophobic layer is microporous.

7. The layered article of claim 1 in which said hydrophobic layer is porous polytetrafluoroethylene.

8. The layered article of claim 1 in which said hydrophilic layer is impermeable to air.

9. The layered article of claim 1 in which said hydrophilic layer is impermeable to air.

10. The layered article of claim 1 in which said hydrophilic layer is a polyether-polyurethane.

11. The layered article of claim 1 in which said hydrophilic layer is a perfluorosulphonic acid membrane.

12. The layered article of claim 1 in which said hydrophilic layer has a moisture vapor transmission rate above 2000 gms./m$^2$. day and no detectable transmission rate for liquid water at hydrostatic pressures of at least about 25 cm water head for 20 minutes.

13. The layered article of claim 1 in which said hydrophilic layer has a moisture vapor transmission rate above 2000 gms./m$^2$. day and no detectable transmission rate for liquid water at hydrostatic pressures of between about 25 cm water head and about 172 kN/M$^2$ for 30 seconds.

14. The layered article of claim 1 in which said hydrophilic layer has a moisture vapor transmission rate above 2000 gms./m$^2$. day and no detectable transmission rate for liquid water at hydrostatic pressures of about 172 kN/M$^2$ for 30 seconds.

15. The layered article of claim 1 in which a wear-resistant textile layer is attached to the outer face of said hydrophobic layer and aligned in laminar relationship therewith.

16. The layered article of claim 15 in which a textile layer is attached to the inner face of said hydrophilic layer and aligned in laminar relationship therewith.

17. The layered article of claim 15 in which said hydrophobic layer is in laminar contact with both said hydrophilic layer and said wear-resistant textile layer.

18. The layered article of claim 17 in which a textile layer is in laminar contact with said hydrophilic layer.

19. The layered article of claim 1 in which said hydrophilic layer has a moisture vapor transmission rate above 2000 gms./m$^2$. day.

20. The layered article of claim 19 in which said hydrophobic layer is in laminar contact with said hydrophilic layer.

21. The layered article of claim 19 in which a textile layer is attached to the inner face of said hydrophilic layer and aligned in laminar relationship therewith.

22. The layered article of claim 19 in which said hydrophilic layer is a polyether-polyurethane.

23. The layered article of claim 19 in which said hydrophilic layer is a perfluorosulphonic acid membrane.

24. The layered article of claim 19 in which said hydrophobic layer is microporous.

25. The layered article of claim 19 in which said hydrophobic layer is porous polytetrafluoroethylene.

26. The layered article of claim 19 in which a wear-resistant textile layer is attached to the outer face of said hydrophobic layer and aligned in laminar relationship therewith.

27. The layered article of claim 26 in which said hydrophobic layer is in laminar contact with both said hydrophilic layer and said wear-resistant textile layer.

28. The layered article of claim 27 in which a textile layer is in laminar contact with said hydrophilic layer.

* * * * *